United States Patent
Bensel et al.

(10) Patent No.: US 11,441,594 B2
(45) Date of Patent: Sep. 13, 2022

(54) FASTENING ASSEMBLY FOR A THIN-WALLED PART OF AN APPLIANCE

(71) Applicant: Haier US Appliance Solutions, Inc., Wilmington, DE (US)

(72) Inventors: Peter Hans Bensel, Louisville, KY (US); Joshua Ernest Gilberts, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 556 days.

(21) Appl. No.: 16/547,914

(22) Filed: Aug. 22, 2019

(65) Prior Publication Data

US 2021/0054869 A1 Feb. 25, 2021

(51) Int. Cl.
*F16B 39/00* (2006.01)
*F16B 39/34* (2006.01)
*D06F 58/20* (2006.01)

(52) U.S. Cl.
CPC .............. *F16B 39/34* (2013.01); *D06F 58/20* (2013.01)

(58) Field of Classification Search
CPC ......... D06F 58/02; F16B 39/34; F16B 39/284
USPC ............................................ 248/73; 411/186
See application file for complete search history.

(56) References Cited

U.S. PATENT DOCUMENTS

| | | | | |
|---|---|---|---|---|
| 487,939 A * | 12/1892 | Smith | ..................... | D06F 58/04 34/139 |
| 2,708,147 A * | 5/1955 | Burke | ..................... | A47B 77/04 248/220.21 |
| 4,307,588 A * | 12/1981 | Smith | ..................... | D06F 39/12 D32/6 |
| 4,516,893 A * | 5/1985 | Barth | ..................... | F16B 25/0021 411/184 |
| 4,518,294 A * | 5/1985 | Barth | ..................... | F16B 39/282 411/311 |
| 4,764,066 A * | 8/1988 | Terrell | ..................... | F16B 39/28 411/399 |
| 4,812,095 A * | 3/1989 | Piacenti | ............... | F16B 39/282 411/959 |
| 4,817,298 A * | 4/1989 | Toma | ..................... | D06F 58/04 34/139 |
| 4,874,277 A * | 10/1989 | Nowak | ................ | F16B 13/122 411/61 |

(Continued)

FOREIGN PATENT DOCUMENTS

| JP | H1043490 A | 2/1998 |
|---|---|---|
| WO | WO2005049909 A1 | 6/2005 |
| WO | WO2015039801 A1 | 3/2015 |

*Primary Examiner* — Gary W Estremsky
(74) *Attorney, Agent, or Firm* — Dority & Manning, P.A.

(57) ABSTRACT

An appliance and fastening assemblies therefore are provided. A method of mounting an object to a part of an appliance using a fastening assembly is also provided. In one aspect, a fastening assembly of an appliance includes a wall defining an engagement hole. The fastening assembly also includes a tab connected to the wall and defining a clearance hole. The tab is folded over onto the wall such that the clearance hole is in communication with the engagement hole. A fastener of the fastening assembly has a head and a shank extending from the head. The shank has threads along at least a portion of the shank. The shank of the fastener is received through the clearance hole and the engagement hole. When the fastener is torqued or driven, a portion of material of the wall is extruded into the clearance hole of the tab.

20 Claims, 9 Drawing Sheets

(56) References Cited

U.S. PATENT DOCUMENTS

| | | | | |
|---|---|---|---|---|
| 5,026,235 A | * | 6/1991 | Muller | B25B 31/00 |
| | | | | 411/523 |
| 5,405,111 A | * | 4/1995 | Medlin, Jr. | H02G 3/125 |
| | | | | 248/906 |
| 5,555,647 A | * | 9/1996 | Torborg | D06F 58/04 |
| | | | | 34/601 |
| 5,622,464 A | * | 4/1997 | Dill | F16B 35/048 |
| | | | | 411/399 |
| 6,209,826 B1 | * | 4/2001 | Pratt, Jr. | E04D 13/0725 |
| | | | | 248/300 |
| 6,508,442 B1 | * | 1/2003 | Dolez | F16L 3/1233 |
| | | | | 248/74.1 |
| 7,024,802 B2 | | 4/2006 | Myung | |
| 7,127,775 B2 | | 10/2006 | Ferre et al. | |
| 8,678,732 B2 | * | 3/2014 | Balbo Di Vinadio | |
| | | | | B65C 9/1819 |
| | | | | 411/386 |
| 8,881,469 B1 | * | 11/2014 | Meyer | E04D 13/1606 |
| | | | | 52/444 |
| 9,476,194 B1 | * | 10/2016 | Hulka | E04B 1/40 |
| 10,668,878 B1 | * | 6/2020 | Sampson | B60R 16/08 |
| 2007/0257161 A1 | * | 11/2007 | Geppert | F16L 3/1233 |
| | | | | 248/74.3 |
| 2009/0140121 A1 | * | 6/2009 | Fujikawa | G02F 1/133308 |
| | | | | 248/544 |
| 2013/0227907 A1 | * | 9/2013 | Gulbrandsen | E04B 9/30 |
| | | | | 52/665 |
| 2014/0155209 A1 | * | 6/2014 | Kato | F16H 7/20 |
| | | | | 474/140 |
| 2017/0335879 A1 | | 11/2017 | Gerlach et al. | |
| 2018/0010283 A1 | | 1/2018 | An et al. | |
| 2018/0355896 A1 | | 12/2018 | Kramer et al. | |

\* cited by examiner

FASTENING ASSEMBLY FOR A THIN-WALLED PART OF AN APPLIANCE

FIELD OF THE INVENTION

The present subject matter relates generally to appliances, such as dryer appliances, and more particularly to fastening assemblies for appliances.

BACKGROUND OF THE INVENTION

Some consumer appliances include thin-walled sheet metal parts. For example, dryer appliances typically include a heater housing formed of thin-walled sheet metal. In some instances, one or more screws are driven into the thin-walled sheet metal, e.g., for connecting two thin-walled sheet metal parts or mounting a component thereto. In driving a screw into a thin-walled sheet metal part, the drive torque setting or application torque in which the screw is driven is typically selected so as not to surpass the strip torque, or the application of torque sufficient to cause the thin-walled sheet metal part and/or the screw to strip or otherwise deform or distort the components.

Conventionally, the screw strip torque associated with thin-walled sheet metal parts has been low. That is, conventionally, due to the low screw strip torque of thin-walled sheet metal parts, it has been relatively easy to strip a thin-walled sheet metal part when driving a screw therein. The relatively low screw strip torque of thin-walled sheet metal parts limits the driving torque that can be used to drive the screw. The limit on driving torque can result in low clamping forces, or a driven screw's ability to grasp and secure the thin-walled sheet metal part and the mating part together. One solution to increasing the screw strip torque of thin-walled sheet metal parts has been to increase the thickness of the wall of the sheet. However, such a solution requires additional materials and leads to higher manufacturing costs.

Accordingly, a fastening assembly for thin-walled sheet metal parts that address one or more of the challenges noted above would be beneficial.

BRIEF DESCRIPTION OF THE INVENTION

Aspects and advantages of the invention will be set forth in part in the following description, or may be apparent from the description, or may be learned through practice of the invention.

In one aspect, an appliance is provided. The appliance includes a fastening assembly. The fastening assembly includes a wall defining an engagement hole. Further, the fastening assembly includes a tab connected to the wall and defining a clearance hole, the tab being folded over onto the wall such that the clearance hole is in communication with the engagement hole of the wall. Moreover, the fastening assembly includes a fastener having a head and a shank extending from the head, the shank of the fastener being received through the clearance hole of the tab and through the engagement hole of the wall, wherein the fastener is torqued such that a portion of material of the wall is extruded into the clearance hole of the tab.

In another aspect, a fastening assembly for an appliance is provided. The fastening assembly defines an axial direction and a radial direction. The fastening assembly includes a wall defining an engagement hole. Further, the fastening assembly includes a tab connected to the wall and having a rim defining a clearance hole, the tab being folded over onto the wall such that the clearance hole is in communication with the engagement hole of the wall. Moreover, the fastening assembly includes a screw having a head, a shank extending from the head, and threads extending along at least a portion of the shank, the shank of the screw being driven into and received by the clearance hole of the tab and the engagement hole of the wall such that the threads of the screw engage the wall and cause a portion of material of the wall to extrude into the clearance hole of the tab along the axial direction and so that the rim supports the portion of material of the wall along the radial direction.

In yet another aspect, a method of mounting an object to a part of an appliance is provided. The method includes folding a tab over onto a wall of the part such that a clearance hole defined by the tab is in communication with an engagement hole defined by the wall. Further, the method includes driving a screw through the clearance hole of the tab and through the engagement hole of the wall to secure the object to the part, wherein driving the screw causes a portion of material of the wall surrounding the engagement hole to extrude into the clearance hole of the tab.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to but need not be limited to fabrics, textiles, garments (or clothing), and linens. Furthermore, the term "load" or "laundry load" refers to the combination of articles that may be washed together in a washing machine or dried together in a laundry dryer (i.e., a clothes dryer) and may include a mixture of different or similar articles of different or similar types and kinds of fabrics, textiles, garments and linens within a particular laundering process.

Figure 1:
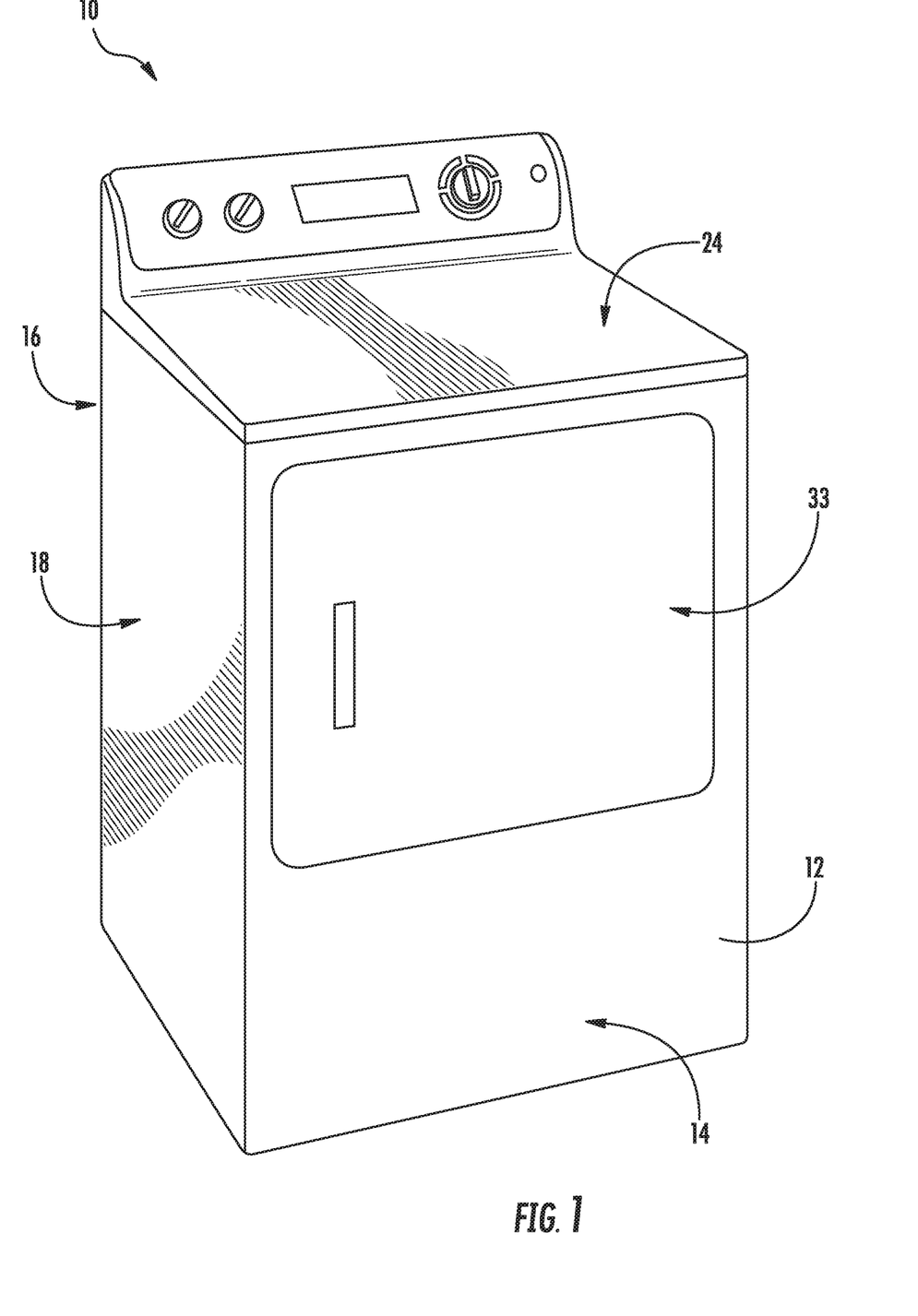
FIG. 1 provides a perspective view of a dryer appliance according to an exemplary embodiment of the present subject matter.
Figure 2:
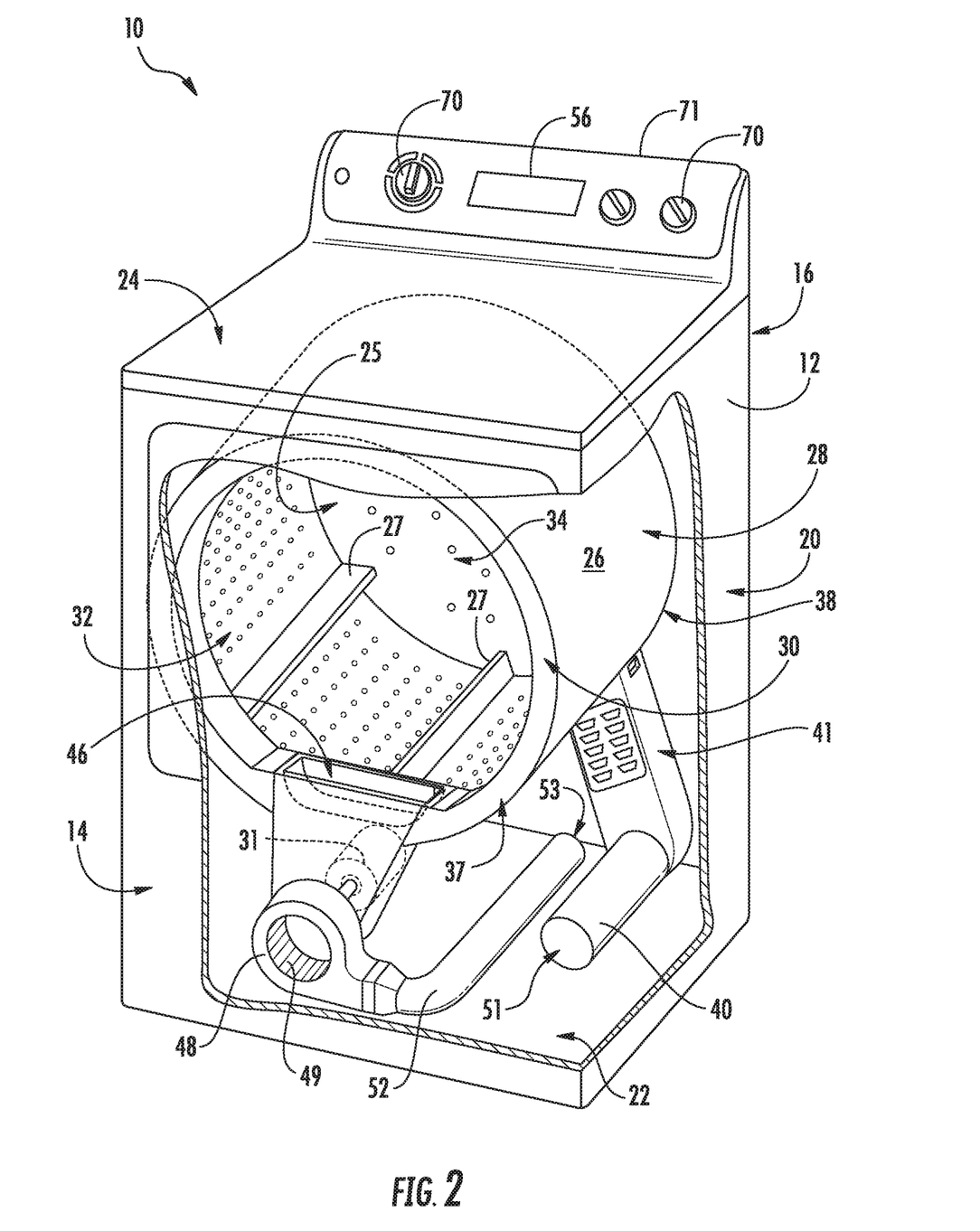
FIG. 2 provides a perspective view of the exemplary dryer appliance of FIG. 1 with a portion of a cabinet of the exemplary dryer appliance removed to reveal certain internal components of the exemplary dryer appliance.

FIGS. 1 and 2 illustrate a dryer appliance 10 according to an exemplary embodiment of the present subject matter. Particularly, FIG. 1 provides a perspective view of dryer appliance 10 and FIG. 2 provides another perspective view of dryer appliance 10 with a portion of a cabinet or housing 12 of dryer appliance 10 removed in order to show certain components of dryer appliance 10. While described in the context of a specific embodiment of dryer appliance 10, using the teachings disclosed herein, it will be understood that dryer appliance 10 is provided by way of example only. Other dryer appliances having different appearances and different features may also be utilized with the present subject matter as well. Furthermore, the inventive aspects of the present disclosure are applicable to other types of appliances, including, without limitation, a washing machine appliance, a refrigerator appliance, a freezer appliance, a microwave appliance, a water heater appliance, oven appliances, cooktop appliances, range appliances, dishwasher appliances, kitchen hub appliances, etc.

Cabinet 12 includes a front panel 14, a rear panel 16, a pair of side panels 18 and 20 spaced apart from each other by front and rear panels 14 and 16, e.g., along a lateral direction. Cabinet 12 also includes a bottom panel 22 and a top cover 24. Bottom panel 22 and top cover 24 are spaced from each other, e.g., along a vertical direction. A drum 26 is rotatably mounted within cabinet 12 for rotation about a substantially horizontal axis. Drum 26 defines a chamber 25 for receipt of articles of clothing for drying. Drum 26 extends between a front portion 37 and a back portion 38, e.g., along a transverse direction.

A motor 31 is configured for rotating drum 26 about the horizontal axis, e.g., via a pulley and a belt (not shown). Drum 26 is generally cylindrical in shape, having an outer cylindrical wall 28 and a front flange or wall 30 that defines an opening 32 of drum 26, e.g., at front portion 37 of drum 26, for loading and unloading of articles into and out of chamber 25 of drum 26. A plurality of lifters or baffles (e.g., baffles 27) are provided within chamber 25 of drum 26 to lift articles therein and then allow such articles to tumble back to a bottom of drum 26 as drum 26 rotates. Baffles 27 may be mounted to drum 26 such that baffles 27 rotate with drum 26 during operation of dryer appliance 10.

Drum 26 also includes a back or rear wall 34, e.g., at back portion 38 of drum 26. Rear wall 34 may be fixed or may be rotatable. A supply duct 41 is mounted to rear wall 34 and receives heated air that has been heated by a heating assembly or system 40. Motor 31 is also in mechanical communication with an air handler 48 such that motor 31 rotates a fan 49, e.g., a centrifugal fan, of air handler 48. Air handler 48 is configured for drawing air through chamber 25 of drum 26, e.g., in order to dry articles located therein. In alternative example embodiments, dryer appliance 10 may include an additional motor (not shown) for rotating fan 49 of air handler 48 independently of drum 26.

Drum 26 is configured to receive heated air that has been heated by heating assembly 40, e.g., in order to dry damp articles disposed within chamber 25 of drum 26. For example, heating assembly 40 may include a heating element (not shown), such as a gas burner, an electrical resistance heating element, or heat pump, for heating air. As discussed above, during operation of dryer appliance 10, motor 31 rotates drum 26 and fan 49 of air handler 48 such that air handler 48 draws air through chamber 25 of drum 26 when motor 31 rotates fan 49. In particular, ambient air enters heating assembly 40 via an inlet 51 due to air handler 48 urging such ambient air into inlet 51. Such ambient air is heated within heating assembly 40 and exits heating assembly 40 as heated air. Air handler 48 draws such heated air through supply duct 41 to drum 26. The heated air enters drum 26 through a plurality of outlets of supply duct 41 positioned at rear wall 34 of drum 26.

Within chamber 25, the heated air may accumulate or extract moisture, e.g., from damp articles disposed within chamber 25. In turn, air handler 48 draws moisture laden air through a screen filter (not shown) which traps lint particles. Such moisture-laden air then enters an exit duct 46 and is passed through air handler 48 to an exhaust duct 52. From exhaust duct 52, the moisture laden air passes out of dryer appliance 10 through a vent 53 defined by cabinet 12. After the articles have been dried, they are removed from the drum 26 via opening 32. A door 33 provides selective access to drum 26 through opening 32.

One or more selector inputs 70, such as knobs, buttons, touchscreen interfaces, etc., may be provided or mounted on a cabinet backsplash 71. The one or more selector inputs 70 are in communication or communicatively coupled with a processing device or controller 56. Signals generated by controller 56 operate motor 31 and heating assembly 40 in response to the position of or inputs to selector inputs 70. Alternatively, a touchscreen type interface may be provided. As used herein, "processing device" or "controller" may refer to one or more microprocessors, microcontroller, ASICS, or semiconductor devices and is not restricted necessarily to a single element. The controller 56 may be programmed to operate dryer appliance 10 by executing instructions stored in memory. The controller may include or be associated with one or more memory elements, such as a non-transitory computer readable media, RAM, ROM, or electrically erasable, programmable read only memory (EEPROM). For example, the instructions may be software or any set of instructions that when executed by the processing device, cause the processing device to perform operations.

Figure 3:
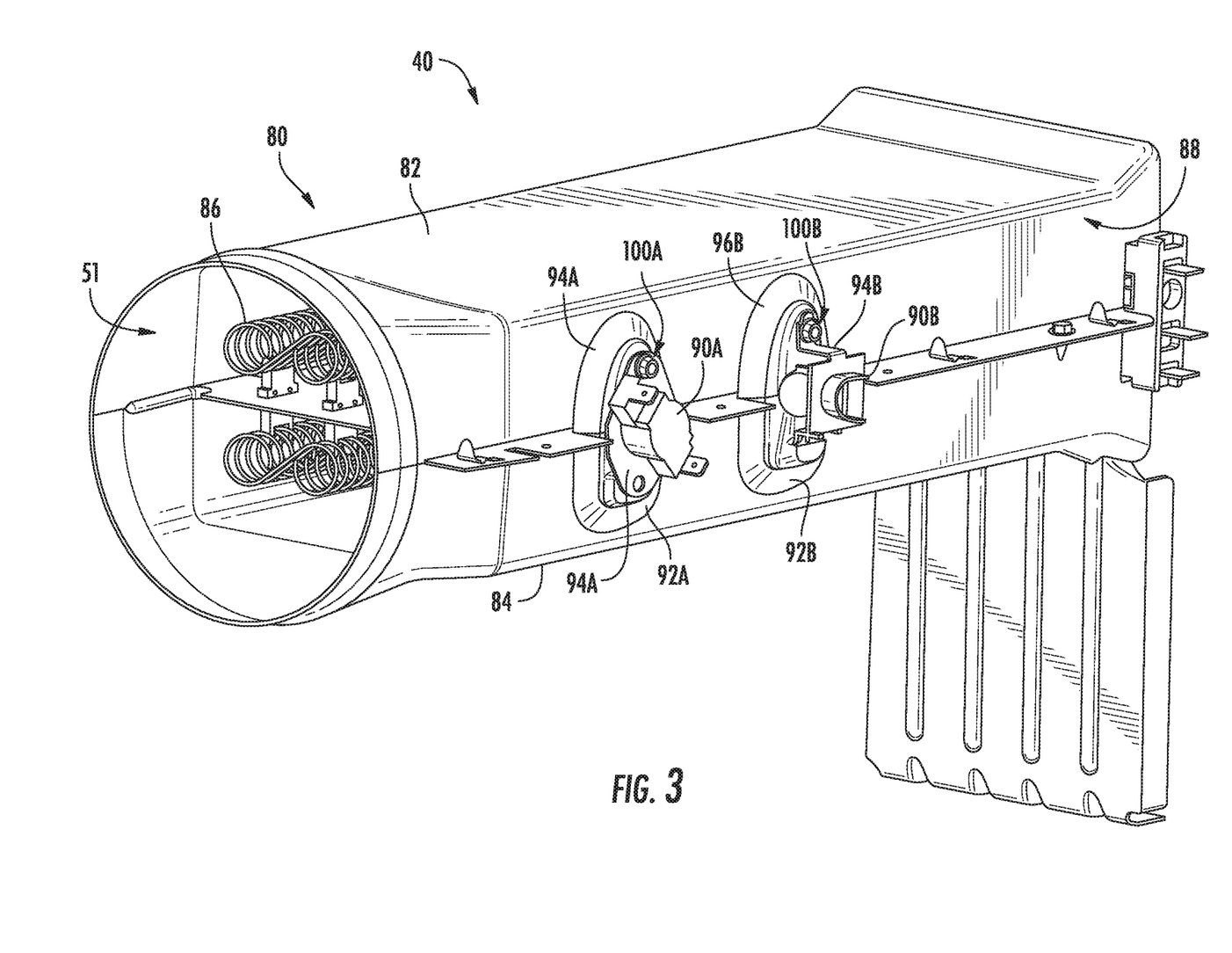
FIG. 3 provides a perspective view of a heating system of the exemplary dryer appliance of FIGS. 1 and 2.

FIG. 3 provides a perspective view of heating system 40 of dryer appliance 10 of FIGS. 1 and 2. For this embodiment, heating system 40 is an electric heater assembly. As depicted, heating system 40 includes a heater housing 80. Heater housing 80 includes a first or upper heater housing 82 and a second or lower heater housing 84 coupled with or connected to upper heater housing 82. Heater housing 80 is formed of a thin-walled sheet metal. However, other thin-walled materials are contemplated. Heating elements 86 are positioned within heater housing 80. For this embodiment, heating elements 86 are electric heating elements operable to heat ambient air moved into heater housing 80 through inlet 51. Heating system 40 also includes a pair of thermostats, including a first thermostat 90A and a second thermostat 90B. First thermostat 90A and second thermostat 90B are operable to sense a temperature of the air within heater housing 80. First thermostat 90A and second thermostat 90B can be communicatively coupled with controller 56 (FIG. 2). In this way, controller 56 can utilize signals sensed by first thermostat 90A and second thermostat 90B to control operation of dryer appliance 10 (FIGS. 1 and 2).

Lower heater housing 84 has two raised embosses, including a first emboss 92A and a second emboss 92B. Upper heater housing 82 also has two raised embosses, including a first emboss 96A and a second emboss 96B. First emboss 96A is sized complementary to and is positioned in communication with first emboss 92A of lower heater housing 84. Likewise, second emboss 96B is sized complementary to and is positioned in communication with second emboss 92B of lower heater housing 84. The complementary embosses of lower heater housing 84 and upper heater housing 82 provide mounting structures to which first thermostat 90A and second thermostat 90B can be mounted, e.g., as shown in FIG. 3.

Particularly, first emboss 92A of lower heater housing 84 defines a slot in which a first bracket 94A of first thermostat 90A can be tabbed or inserted into to secure first thermostat 90A to lower heater housing 84. Similarly, second emboss 92B of lower heater housing 84 defines a slot in which a second bracket 94B of second thermostat 90B can be tabbed or inserted into to secure second thermostat 90B to lower heater housing 84. Notably, heating system 40 includes a first fastening assembly 100A for securing first thermostat 90A to upper heater housing 82 and a second fastening assembly 100B for securing second thermostat 90B to upper heater housing 82.

Figure 4:
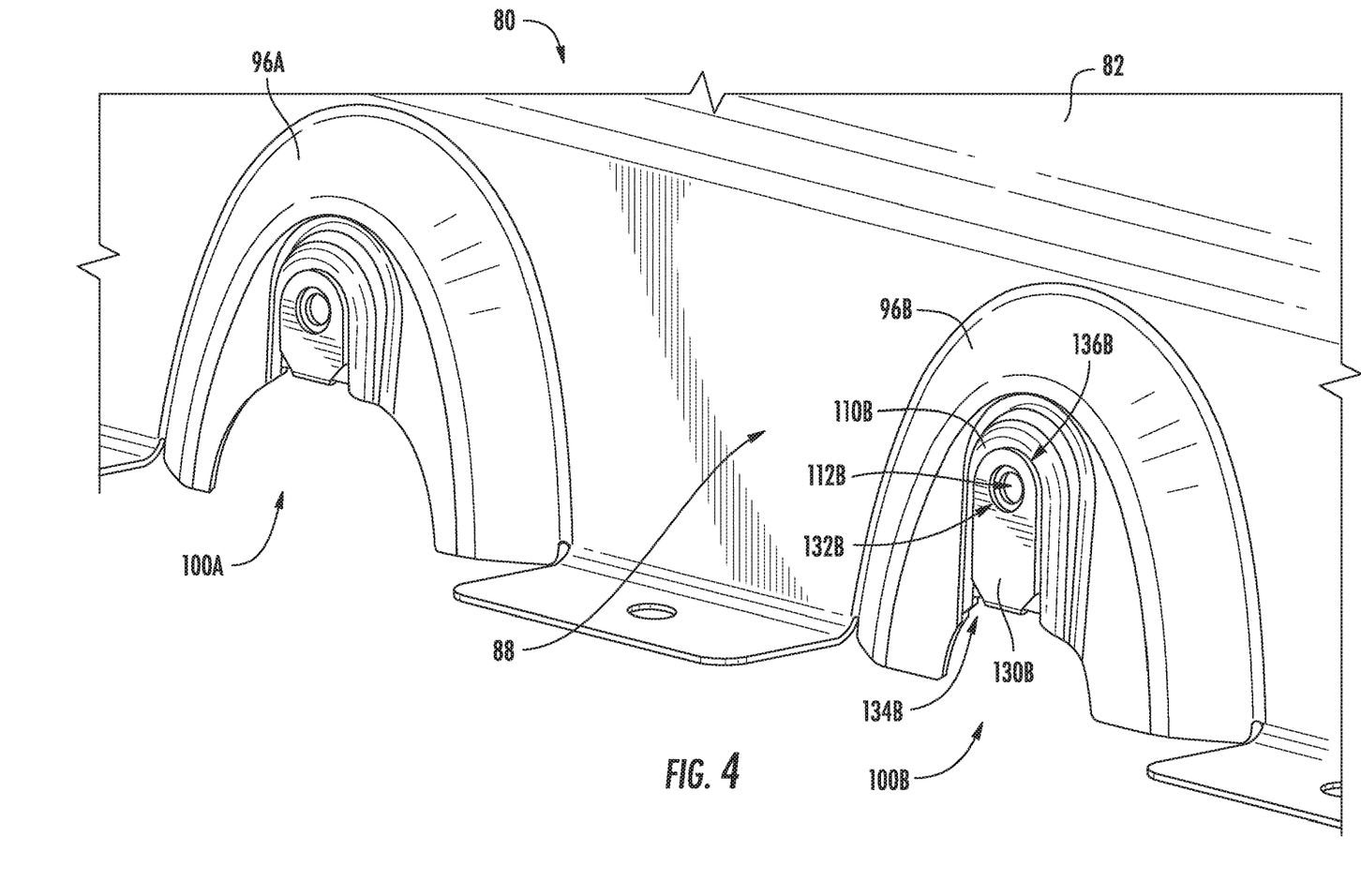
FIG. 4 provides a close up perspective view of an upper heater housing of the heater system of FIG. 3.
Figures 5, 6:
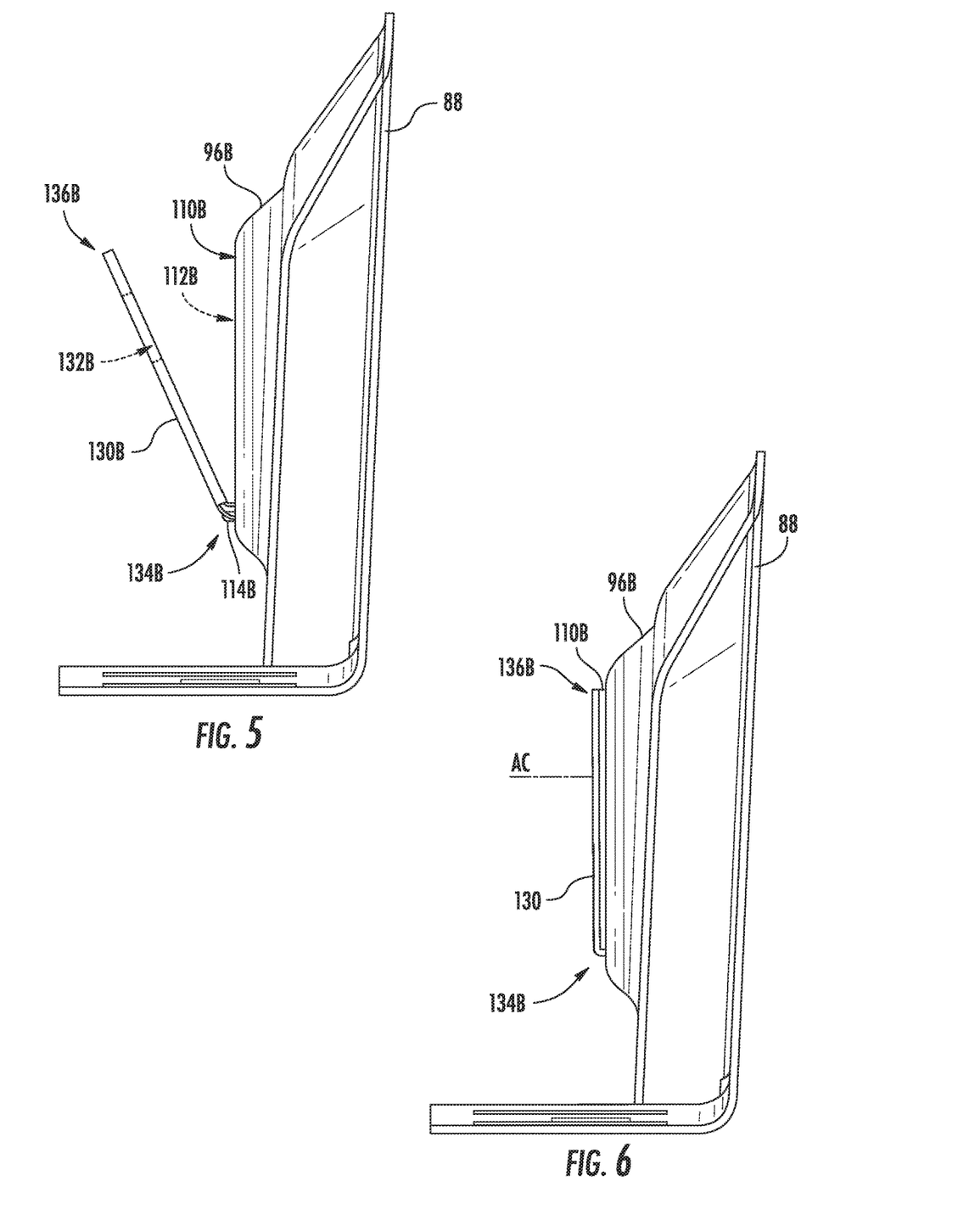
FIG. 5 provides a side view of the upper heater housing of FIG. 4 and depicts a tab of a fastening assembly in a partially folded over position.
FIG. 6 provides a side view of the upper heater housing of FIG. 4 and depicts the tab in a completely folded over position.
Figure 7:
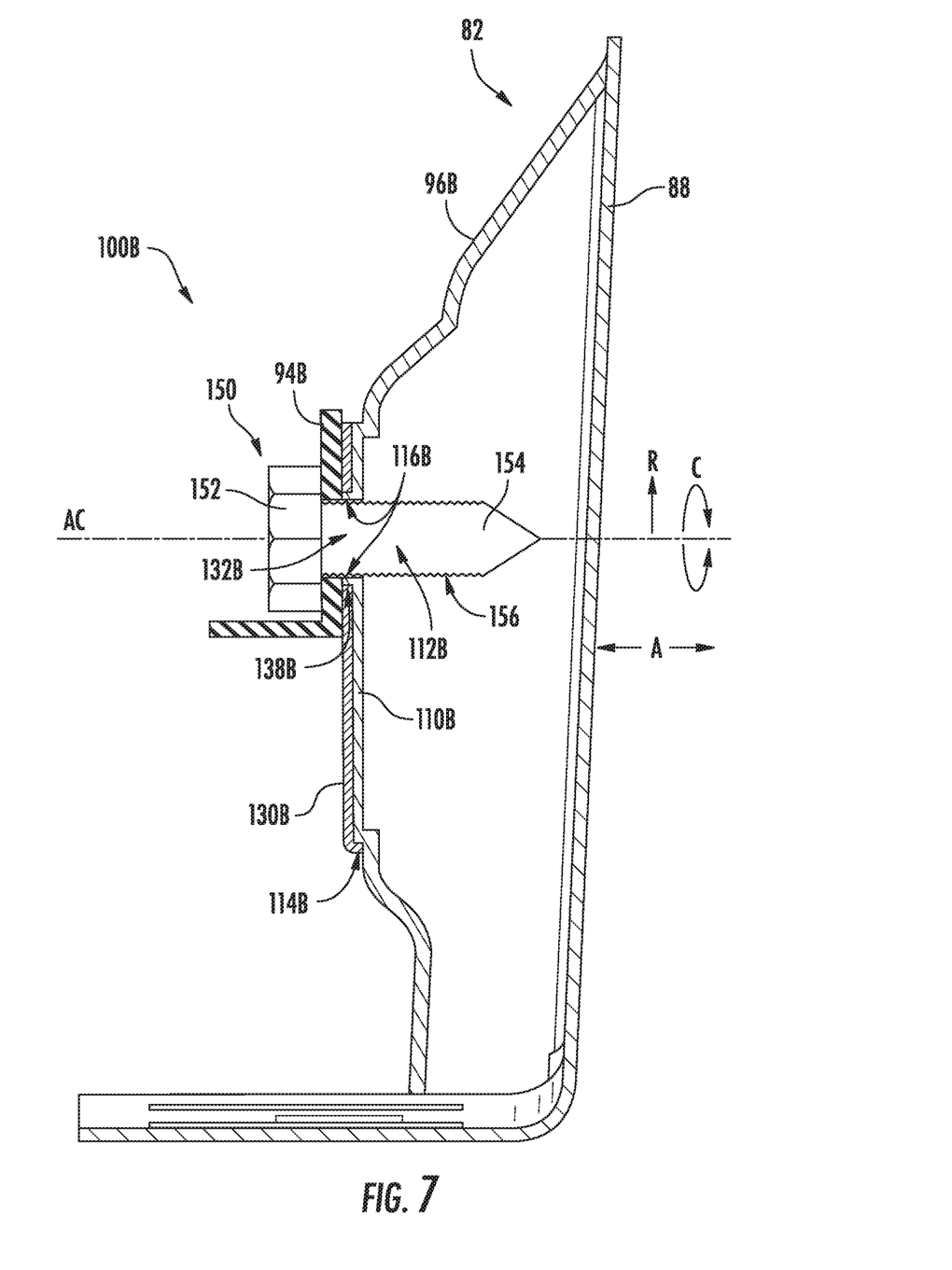
FIG. 7 provides a side cross-sectional view of the upper heater housing of FIG. 4 and depicts a screw driven into the upper heater housing.

FIGS. 4, 5, 6, and 7 provide various views of a fastening assembly according to an exemplary embodiment of the present subject matter. Particularly, FIG. 4 provides a close up perspective view of upper heater housing 82 of heater housing 80. FIG. 5 provides a side view of upper heater housing 82 and depicts a tab 130 of second fastening assembly 100B in a partially folded over position. FIG. 6 provides a side view of upper heater housing 82 and depicts tab 130 in a folded over position. FIG. 7 provides a side cross-sectional view of upper heater housing 82 and depicts a screw 150 driven into upper heater housing 82.

Second fastening assembly 100B will now be described in more detail. As depicted, upper heater housing 82 has a sidewall 88. Second emboss 96B extends outward from sidewall 88 (as does first emboss 96A). As shown best in FIG. 5, second emboss 96B has a wall 110B. Wall 110B defines an engagement hole 112B through which a fastener, such as screw 150, can be received. Thus, engagement hole 112B is sized to receive screw 150. Wall 110B is formed of a thin-walled sheet metal in this example embodiment. Wall 110B has a hemmed edge 114B.

A tab 130B is connected to wall 110B at edge 114B. Tab 130B is formed of a thin-walled sheet metal in this example embodiment. Tab 130B extends between a proximal end 134B, which is connected to wall 110B at edge 114B, and a distal end 136B. Distal end 136B of tab 130B is a free end. That is, distal end 136B is not connected to wall 110B; rather, tab 130B is cantilevered or connected to wall 110B at one end. Tab 130B defines a clearance hole 132B through which a fastener, such as screw 150, can be received. Notably, tab 130B is folded over or back onto wall 110B. For this embodiment, tab 130B is folded over onto wall 110B by one hundred eighty degrees (180°). Particularly, tab 130B is folded over or back onto wall 110B such that clearance hole 132B of tab 130B is substantially concentric with engagement hole 112B of wall 110B. That is, tab 130B is folded over so that clearance hole 132 of tab 130B and engagement hole 112B are aligned so that screw 150 can be passed through or received within clearance hole 132 and engagement hole 112B at the same time. For reference, an axial centerline extends through the center of engagement hole 112B and clearance hole 132B along an axial direction A, e.g., as shown in FIG. 7. A radial direction R extends inward and outward from the axial centerline AC orthogonal to the axial direction A. Moreover, a circumferential direction C extends three hundred sixty degrees (360°) about the axial centerline AC, which as noted above, extends along the axial direction A.

Fastener 150 has a head 152 and a shank 154 extending from head 152. Shank 154 includes threads 156 along its outer diameter. When torqued or driven into wall 110B to secure second bracket 94B to upper heater housing 82, threads 156 of screw 150 can engage surfaces of second bracket 94B and wall 110B, and as will be explained further below, the torqueing of screw 150 can cause a portion of material 116B to be extruded into clearance hole 132B of tab 130B.

With reference to FIG. 7, an example manner in which screw 150 can be driven into upper heater housing 82 will now be described. With a hole defined by second bracket 94B, clearance hole 132B of tab 130B, and engagement hole 112B all aligned or in communication, e.g., substantially concentric, screw 150 is driven into upper heater housing 82. When driven, shank 154 of screw 150 is received first by the hole defined by second bracket 94B, second by clearance hole 132B of tab 130B, and third by engagement hole 112B of wall 110B. Screw 150 can be driven by a torque gun or by a screwdriver, for example.

Notably, as screw 150 is driven into upper heater housing 82, fastener 150 is torqued such that a portion of material 116B of wall 110B is extruded into the clearance hole 132 of tab 130. More particularly, as illustrated in FIG. 7, the portion of material 116B of wall 110B is extruded axially into clearance hole 132B of tab 130B. That is, as the threads 156 of screw 150 engage wall 110B, the threads 156 cause the portion of material 116B to self-extrude toward head 152 of screw 150 along the axial direction A. The portion of material 116B of wall 110B is extruded into clearance hole 132B of tab 130B such that the portion of material 116B forms a ring or annular rim around the portion of shank 154 received within clearance hole 132B. In this manner, the portion of material 116B of wall 110B extruded into clearance hole 132B of tab 130B is radially supported by tab 130B. Stated another way, a rim 138 of tab 130B that extends circumferentially along the perimeter of clearance hole 132 engages and supports the portion of material 116B extruded through clearance hole 132B along the radial direction R.

Clearance hole 132B of tab 130B and engagement hole 112B of wall 110B are appropriately sized relative to one another. Particularly, clearance hole 132B of tab 130B has a depth (i.e., the thickness of rim 138) that allows for the portion of material 116B of wall 110B to be extruded into clearance hole 132B. Moreover, clearance hole 132B is small enough in diameter to offer radial or hoop support to the portion of material 116B of wall 110B extruded into clearance hole 132B by screw 150. The extruded portion of material 116B and additional radial support provided by rim 138B increases the strip torque of the thin sheet metal wall 110B without or without significantly impacting the drive torque required to drive screw 150 into upper heater housing 82. As will be appreciated, first fastening assembly 100A can be similarly configured as second fastening assembly 100B.

Figure 8:
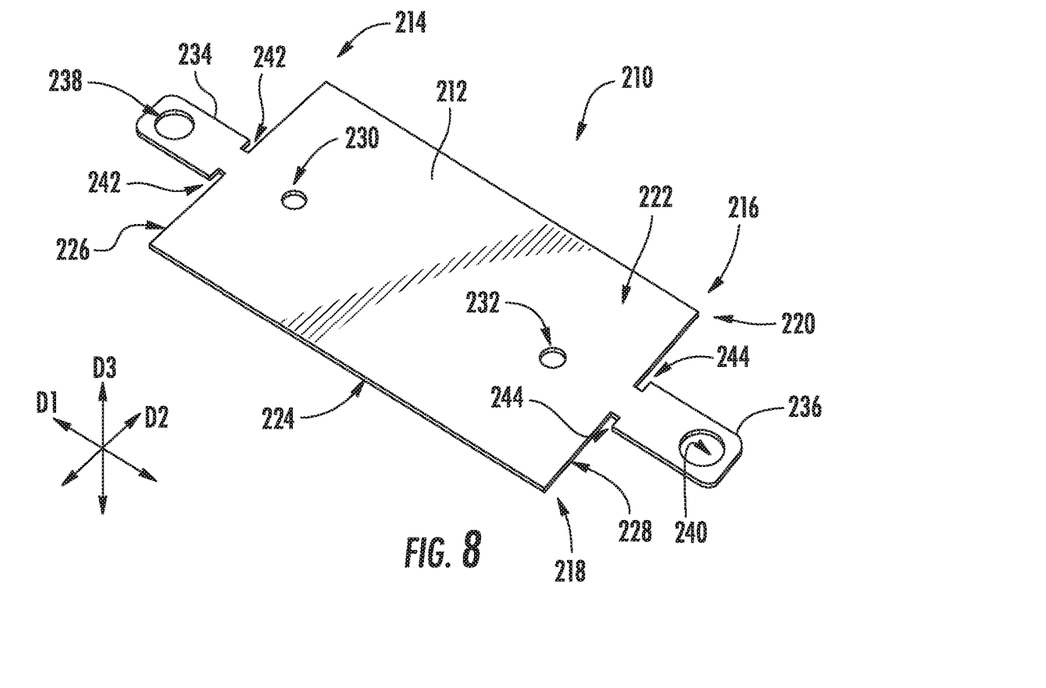
FIG. 8 provides a perspective view of an exemplary thin-walled sheet metal part according to an exemplary embodiment of the present subject matter.
Figure 9:
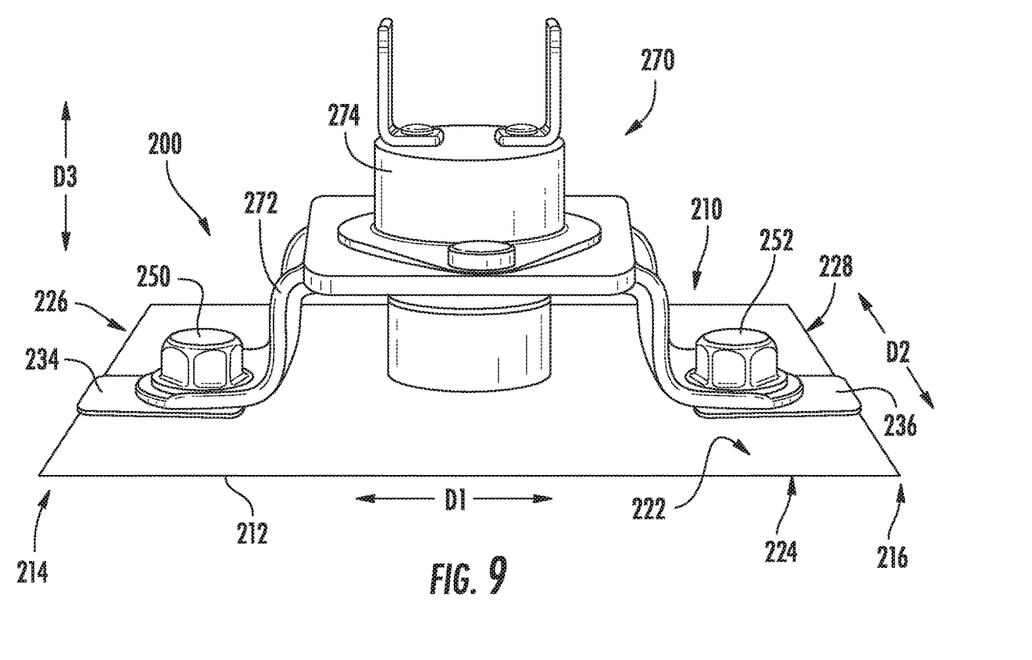
FIG. 9 provides a perspective view of a fastening assembly utilizing the thin-walled sheet metal part of FIG. 8.
Figure 10:
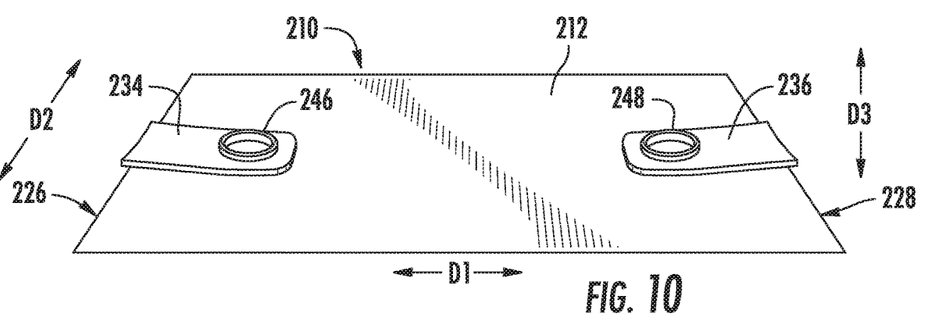
FIG. 10 provides a perspective view of the thin-walled sheet metal part of FIG. 8 and depicts a portion of material of the wall extruded through each clearance hole defined by respective tabs of the thin-walled sheet metal part.
Figure 11:
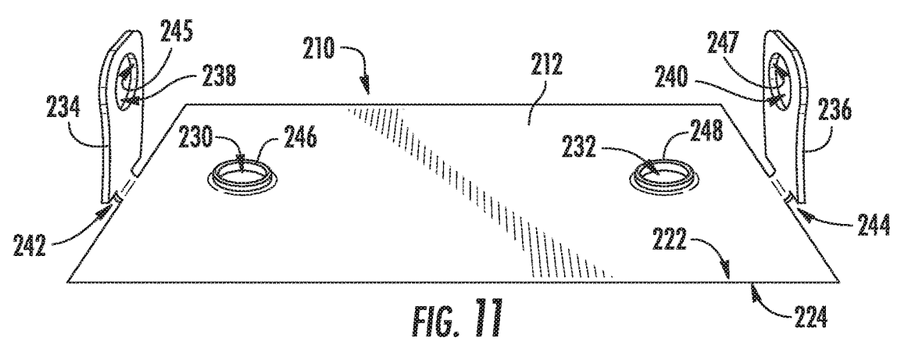
FIG. 11 provides another perspective view of the thin-walled sheet metal part of FIG. 8 and depicts the tabs partially folded so as to more clearly show the extruded portions of material of the wall.

FIGS. 8 through 11 provide various views of an example fastening assembly 200 and parts thereof according to an exemplary embodiment of the present subject matter. Particularly, FIG. 8 provides a perspective view of an exemplary thin-walled sheet metal part 210. FIG. 9 provides a perspective view of a fastening assembly utilizing the thin-walled sheet metal part 210 of FIG. 8. FIG. 10 provides a perspective view of the thin-walled sheet metal part 210 of FIG. 8 and depicts a portion of material of the wall extruded through each clearance hole defined by respective tabs. FIG. 11 provides another perspective view of the thin-walled sheet metal part 210 of FIG. 8 and depicts the tabs partially folded so as to more clearly show the extruded portions of material of the wall.

With reference specifically to FIG. 8, as shown, thin-walled sheet metal part 210 has a wall 212 that extends between a first end 214 and a second end 216, e.g., along a first direction D1, and between a first side 218 and a second side 220, e.g., along a second direction D2. Wall 212 extends between a first surface 222 and a second surface 224, e.g., along a third direction D3. The thickness of wall 212 extends along the third direction D3 between first surface 222 and second surface 224. Wall 212 is planar and has a first edge 226 at first end 214 and a second edge 228 at second end 216. Wall 212 defines a first engagement hole 230 and a second engagement hole 232.

Thin-walled sheet metal part 210 also includes a first tab 234 connected to wall 212 at first end 214 and a second tab 236 connected to wall 212 at second end 216. First tab 234 has a proximal end and a distal end. Likewise, second tab 236 has a proximal end and a distal end. For this embodiment, the proximal end of first tab 234 is connected to first edge 226 of wall 212 at first end 214 and the proximal end of second tab 236 is connected to second edge 228 of wall 212 at second end 216. The distal ends of first tab 234 and second tab 236 are free ends that are not connected to wall 212. In some embodiments, first tab 234 need not be connected to an edge of wall 212 and second tab 236 need not be connected to an edge of wall 212. It will be appreciated that more or less than two tabs configured as described herein can be provided.

First tab 234 defines a first clearance hole 238 and second tab defines a second clearance hole 240. First clearance hole 238 is larger in diameter than first engagement hole 230 and second clearance hole 240 is larger in diameter than second engagement hole 232. First clearance hole 238 is aligned with first engagement hole 230 along the second direction D2 and second clearance hole 240 is aligned with second engagement hole 232 along the second direction D2.

First tab 234 also defines a pair of relief cutouts 242 at its proximal end to relieve strain on the proximal end of first tab 234 and first edge 226 of wall 212 when first tab 234 is folded over onto wall 212. Relief cutouts 242 may also reduce the force necessary to fold over first tab 234 and also reduce the amount of material of thin-walled sheet metal part 210. In a similar manner, second tab 236 defines a pair of relief cutouts 244 at its proximal end to relieve strain on the proximal end of second tab 236 and second edge 228 of wall 212 when second tab 236 is folded over onto wall 212. Relief cutouts 244 may also reduce the force necessary to fold over second tab 236 and also reduce the amount of material of thin-walled sheet metal part 210. The relief cutouts 242, 244 defined by first tab 234 and second tab 236 are generally rectangular in shape and are defined at the first and second sides of the respective tabs 234, 236. As will be explained further below, other configurations of relief cutouts are contemplated.

With reference now to FIG. 9, a mountable object 270 is shown mounted or fastened to thin-walled sheet metal part 210 via fastening assembly 200. For this embodiment, mountable object 270 includes a bracket 272 and a thermostat 274. However, it will be appreciated that mountable object 270 can be any suitable object. As illustrated in FIG. 9, first tab 234 is shown folded over onto wall 212 such that first clearance hole 238 is in communication with first engagement hole 230 of wall 212. Similarly, second tab 236 is shown folded over onto wall 212 such that second clearance hole 240 is in communication with second engagement hole 230 of wall 212. A first screw 250 is shown driven into thin-walled sheet metal part 210 to secure a first end of bracket 272 thereto and a second screw 252 is depicted driven into thin-walled sheet metal part 210 to secure a second end of bracket 272 thereto. First screw 250 and second screw 252 each have a head and a shank extending from the head, as well as threads extending along at least a portion of the shank.

When first screw 250 is driven into thin-walled sheet metal part 210, the shank of first screw 250 is first received or passed through a hole defined by the first end of bracket 272. Then, the shank of first screw 250 is received or passed through first clearance hole 238 (FIG. 8) defined by first tab 234. Thereafter, the shank of first screw 250 is received or passed through first engagement hole 230 (FIG. 8) defined by wall 212. Likewise, when second screw 252 is driven into thin-walled sheet metal part 210, the shank of second screw 252 is first received or passed through a hole defined by the second end of bracket 272. Then, the shank of second screw 252 is received or passed through second clearance hole 240 (FIG. 8) defined by second tab 236. Thereafter, the shank of second screw 252 is received or passed through second engagement hole 232 (FIG. 8) defined by wall 212.

When first screw 250 is being driven into thin-walled sheet metal part 210, first screw 250 is rotated or torqued such that a portion of material of wall 212 is extruded into first clearance hole 238 (FIG. 8) of first tab 234. That is, the threads of first screw 250 engage the material surrounding first engagement hole 230 and pull or extrude the material toward the head of first screw 250 along the third direction D3 and into first clearance hole 238. Moreover, similarly, when second screw 252 is driven into thin-walled sheet metal part 210, second screw 252 is rotated or torqued such that a portion of material of wall 212 is extruded into second clearance hole 240 (FIG. 8) of second tab 236. That is, the threads of second screw 252 engage the material surrounding second engagement hole 232 and pull or extrude the material toward the head of second screw 252 along the third direction D3 and into second clearance hole 240.

With reference now to FIGS. 10 and 11, movable object 270 and screws 250, 252 are shown removed from thin-walled sheet metal part 210 for illustrative purposes. As shown, when first screw 250 is driven into thin-walled sheet metal part 210, torqueing of first screw 250 causes the threads thereof to extrude or otherwise move a portion of material 246 of wall 212 into first clearance hole 238 of first tab 234. In some embodiments, the portion of material 246 of wall 212 can extrude through first clearance hole 238 along the third direction D3, e.g., as shown in FIG. 10. In addition, when second screw 252 is driven into thin-walled sheet metal part 210, torqueing of second screw 252 causes the threads thereof to extrude or otherwise move a portion of material 248 of wall 212 into second clearance hole 240 of second tab 236. In some embodiments, the portion of material 248 of wall 212 can extrude through second clearance hole 240 along the third direction D3.

For this embodiment, first clearance hole 238 of first tab 234 and first engagement hole 230 of wall 212 are appropriately sized relative to one another to allow for the portion of material 246 to extrude through first clearance hole 238 and for a hoop or rim 245 of first tab 234 to provide radial or hoop support to the portion of material 246 extruded into first clearance hole 238. Similarly, second clearance hole 240 of second tab 236 and second engagement hole 232 of wall 212 are appropriately sized relative to one another to allow for the portion of material 248 to extrude through second clearance hole 240 and for a hoop or rim 247 of second tab 236 to provide radial or hoop support to the portion of material 248 extruded into second clearance hole 240. The extruded portions of material 246, 248 and additional hoop support provided by rims 245, 247 can increase the strip torque of the thin-walled sheet metal part 210 without or without significantly impacting the drive torque required to drive screws 250, 252 therein. Moreover, the extruded portions of material can increase the axial length of material (e.g., the length of material extending along the third direction D3 in this example) to which a screw can grasp material, which may increase the clamp force of the driven screws.

Figure 12:
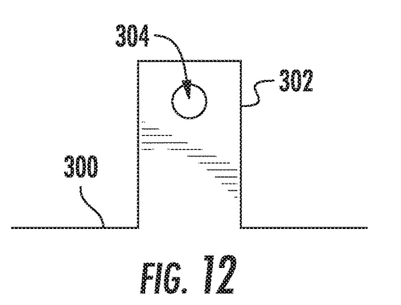
FIGS. 12, 13, and 14 provide various plan views of example tabs connected to respective thin-walled parts according to an exemplary embodiment of the present subject matter.
Figure 13:
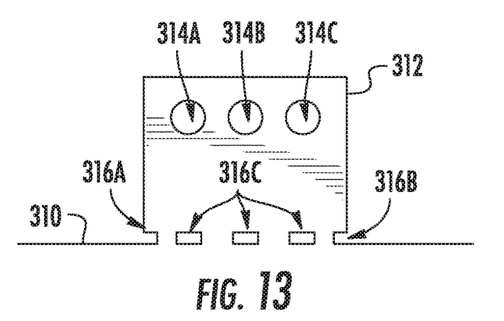
Figure 14:
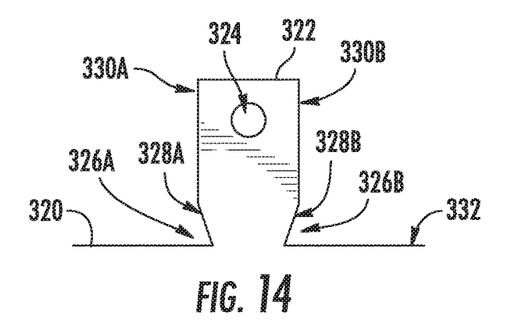

FIGS. 12 through 14 provide various plan views of example tabs connected to a thin-walled part according to an exemplary embodiment of the present subject matter. In FIG. 12, a tab 302 extends from a wall 300. Tab 302 defines a clearance hole 304. When tab 302 is folded over onto wall 300, clearance hole 304 can be in communication with an engagement hole (not shown in FIG. 12) defined by wall 300. For the depicted embodiment of FIG. 12, tab 302 does not define any relief cutouts.

In FIG. 13, a tab 312 extends from a wall 310. Tab 312 defines a plurality of clearance holes, including a first clearance hole 314A, a second clearance hole 314B, and a third clearance hole 314C. When tab 312 is folded over onto wall 310, the clearance holes 314A, 314B, 314C can be in communication with respective engagement holes (not shown in FIG. 13) defined by wall 310. Moreover, for the depicted embodiment of FIG. 13, tab 312 defines a plurality of relief cutouts, including a first side cutout 316A defined by tab 312 at its first side and proximal end, a second side cutout 316B defined by tab 312 at its second side and proximal end, and one or more interior relief cutouts 316C at the proximal end of tab 312. The one or more interior relief cutouts 316C are spaced evenly from one another and the side relief cutouts 316A, 316B.

In FIG. 14, a tab 322 extends from a wall 320. Tab 322 defines a clearance hole 324. When tab 322 is folded over onto wall 320, clearance hole 324 can be in communication with an engagement hole (not shown in FIG. 14) defined by wall 320. For the depicted embodiment of FIG. 14, tab 322 defines a pair of relief cutouts, including a first side cutout 326A defined by tab 322 at its first side and proximal end and a second side cutout 326B defined by tab 312 at its second side and proximal end. For this embodiment, first side cutout 326A and second side cutout 326B are angled cutouts. As shown, tab 322 has a first angled edge 328A that is neither parallel to a first side edge 330A nor an edge 332 of wall 320, wherein first side edge 330A is perpendicular to edge 332 of wall 320. Tab 322 also has a second angled edge 328B that is neither parallel to a second side edge 330B nor edge 332 of wall 320, wherein second side edge 330B is perpendicular to edge 332 of wall 320. The angled edges 328A, 328B and a portion of edge 332 of wall 320 define the angled first side cutout 326A and second side cutout 326B, respectively.

Figure 15:
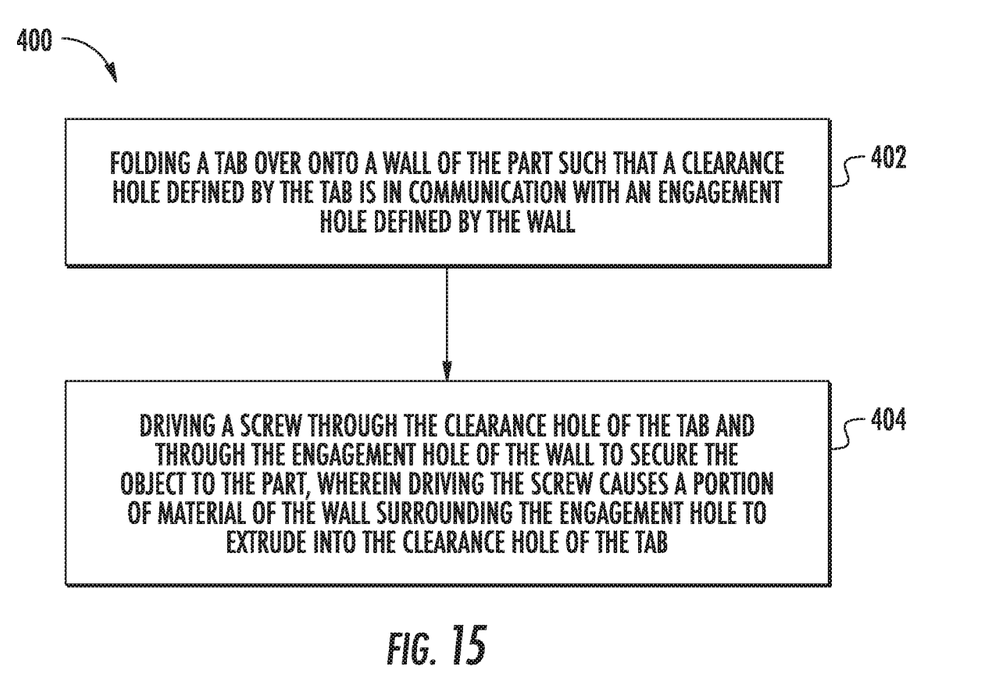
FIG. 15 provides a flow diagram of a method of mounting an object to a part of an appliance according to exemplary embodiments of the present subject matter.

FIG. 15 provides a flow diagram of a method (400) of mounting an object to a part of an appliance according to exemplary embodiments of the present subject matter. For instance, the mountable object of FIG. 9 described herein can be mounted as set forth in method (400). Other objects can be mounted using method (400) as well. FIG. 15 depicts steps performed in a particular order for purposes of illustration and discussion. Those of ordinary skill in the art, using the disclosures provided herein, will understand that various steps of any of the methods disclosed herein can be modified in various ways without deviating from the scope of the present disclosure.

At (402), the method (400) includes folding a tab over onto a wall of the part such that a clearance hole defined by the tab is in communication with an engagement hole defined by the wall. For instance, the tab can be any of the tabs described or illustrated in the drawings. In some implementations, in folding the tab over onto the wall of the part, the clearance hole and the engagement hole are concentric or substantially concentric. Further, in some implementations, the tab extends between a proximal end and a distal end. The wall can be connected to the proximal end of tab and the distal end of the tab is disconnected or free from the wall.

At (404), the method (400) includes driving a screw through the clearance hole of the tab and through the engagement hole of the wall to secure the object to the part, wherein driving the screw causes a portion of material of the wall surrounding the engagement hole to extrude into the clearance hole of the tab. In some implementations, the portion of material of the wall extruded into the clearance hole of the tab is radially supported by a rim extending along a perimeter of the clearance hole. For instance, the rim can be rim 138B of the embodiment of FIG. 7 or one of the rims 245 or 247 of the embodiment of FIG. 11. Further, in some implementations, the portion of material of the wall extruded into the clearance hole of the tab extends through the clearance hole, e.g., as shown in FIG. 10.

The fastening assemblies disclosed herein provide a number of advantages and benefits. For instance, an inventive fastening assembly provided herein increases the screw strip torque and clamp force of the screw, which decreases the chance of the screw backing out or becoming loose. Moreover, a manufacturing advantage is also provided. The fastening assembly of the present disclosure increases the strip torque without significantly increasing the drive torque required to drive a screw into a thin-walled sheet metal part. This may allow for a bigger window for gun torque set points and increases the likelihood of being able to set drive torque to a common setting. Furthermore, the thickness of the thin-walled sheet metal part need not be increased as a foldable tab is utilized in the inventive fastening assemblies of the present disclosure to achieve the same effect of a thin-walled sheet metal part having an increased thickness.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, comprising:
 a fastening assembly, comprising:
  a part having a wall and a tab extending from the wall, the wall defining an engagement hole and the tab defining a clearance hole, the tab being folded over onto the wall such that the clearance hole is in communication with the engagement hole of the wall; and
  a fastener having a head and a shank extending from the head, the shank of the fastener being received through the clearance hole of the tab and through the engagement hole of the wall, wherein the fastener is torqued such that a portion of material of the wall is extruded into the clearance hole of the tab.

2. The appliance of claim 1, wherein the shank of the fastener extends axially through the clearance hole and the engagement hole, and wherein the portion of material of the wall is extruded axially into the clearance hole.

3. The appliance of claim 2, wherein the portion of material of the wall that is extruded axially into the clearance hole is radially supported by a rim of the tab extending along a perimeter of the clearance hole.

4. The appliance of claim 1, wherein the portion of material of the wall is extruded into the clearance hole of the tab such that the portion of material forms a ring around and is engaged by the fastener.

5. The appliance of claim 1, wherein the portion of material of the wall is extruded through the clearance hole of the tab.

6. The appliance of claim 1, wherein the fastener is a screw having threads extending along at least a portion of the shank, and wherein the threads of the fastener engage the wall, and when the screw is torqued, the threads cause the portion of material to extrude into the clearance hole of the tab.

7. The appliance of claim 1, wherein the tab extends between a proximal end and a distal end, and wherein the proximal end of the tab is connected to the wall and the distal end is a free end.

8. The appliance of claim 7, wherein the tab defines one or more relief cutouts at the proximal end of the tab.

9. The appliance of claim 1, wherein the wall and the tab are formed of sheet metal.

10. The appliance of claim 1, wherein the appliance is a dryer appliance.

11. A fastening assembly for an appliance, the fastening assembly defining an axial direction and a radial direction, the fastening assembly comprising:
 a wall defining an engagement hole;
 a tab connected to the wall and having a rim defining a clearance hole, the tab being folded over onto the wall such that the clearance hole is in communication with the engagement hole of the wall, the tab extends between a proximal end and a distal end, the proximal end of the tab being connected to the wall and the distal end being a free end, the tab defines one or more relief cutouts at the proximal end of the tab; and
 a screw having a head, a shank extending from the head, and threads extending along at least a portion of the shank, the shank of the screw being driven into and received by the clearance hole of the tab and the engagement hole of the wall such that the threads of the screw engage the wall and cause a portion of material of the wall to extrude into the clearance hole of the tab along the axial direction and so that the rim supports the portion of material of the wall along the radial direction.

12. The fastening assembly of claim 11, wherein the tab is folded over onto the wall such that the clearance hole is substantially concentric with the engagement hole of the wall.

13. The fastening assembly of claim 11, wherein a bracket of an object mounted is positioned between the head of the screw and the tab along the axial direction.

14. The fastening assembly of claim 11, wherein the wall is a wall of a heater housing for a dryer appliance.

15. The fastening assembly of claim 11, wherein the tab extends between a first side and a second side, and wherein the one or more relief cutouts include a first angled cutout at the proximal end at the first side of the tab and a second angled cutout at the proximal end at the second side of the tab.

16. The fastening assembly of claim 11, wherein the one or more relief cutouts include a plurality of relief cutouts at the proximal end of the tab.

17. A method of mounting an object to a part of an appliance, the method comprising:
 folding a tab of the part over onto a wall of the part such that a clearance hole defined by the tab is in communication with an engagement hole defined by the wall, the tab extending from the wall; and
 driving a screw through the clearance hole of the tab and through the engagement hole of the wall to secure the object to the part, wherein driving the screw causes a portion of material of the wall surrounding the engagement hole to extrude into the clearance hole of the tab.

18. The method of claim 17, wherein the tab is folded over onto the wall by one hundred eighty degrees (180°).

19. The method of claim 17, wherein the portion of material of the wall extruded into the clearance hole of the tab is radially supported by a rim extending along a perimeter of the clearance hole.

20. The method of claim 17, wherein the portion of material of the wall extruded into the clearance hole of the tab extends through the clearance hole.

* * * * *